March 24, 1959 F. L. PUTZRATH 2,879,448

TELEVISION DISPLAY SWEEP LINEARIZATION

Filed March 8, 1954

INVENTOR.

Franz L. Putzrath

BY

ATTORNEY

United States Patent Office 2,879,448
Patented Mar. 24, 1959

2,879,448

TELEVISION DISPLAY SWEEP LINEARIZATION

Franz L. Putzrath, Oaklyn, N.J., assignor to Radio Corporation of America, a corporation of Delaware Application March 8, 1954, Serial No. 414,684

12 Claims. (Cl. 315—27)

Figure 1:
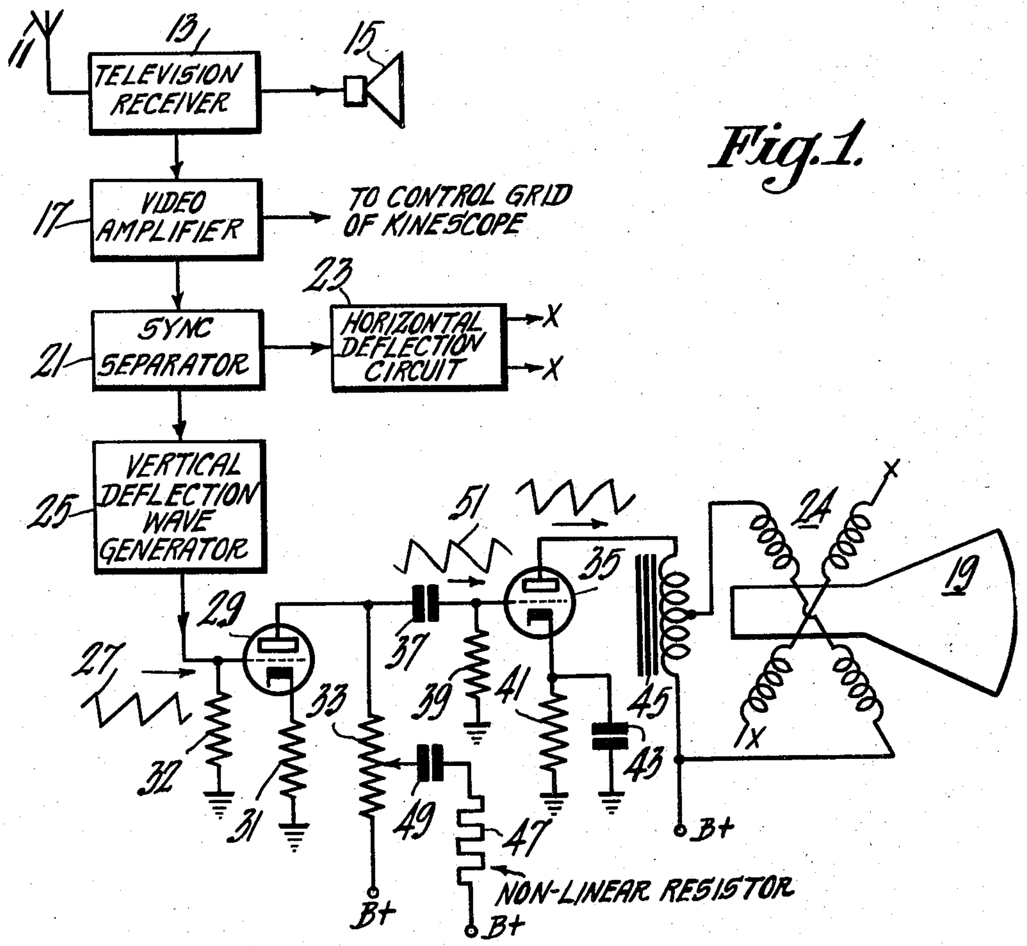

This invention relates to television, and more particularly, to circuits for deflecting an electron beam to trace a raster in a cathode ray tube.

In present television practice, an image is formed in a cathode ray tube, or kinescope, by an electron beam which is deflected to trace successive lines forming a raster upon a fluorescent screen. Deflection of the electron beam is accomplished magnetically by applying sawtooth waves of current to the windings of a deflection yoke mounted about the neck of the cathode ray tube. The electron beam scans across a line of the raster as the current flow increases in the windings of the deflection yoke and is abruptly snapped back to the beginning of the next line when the sharp trailing edge of the sawtooth wave abruptly changes the current flow. If the deflection current increases at a linear rate, the electron beam will be deflected at a substantially uniform angular rate. However, it is more desirable that the luminescent spot formed by the electron beam, trace across the fluorescent screen at a linear rate; and because of the geometry of the cathode ray tube, uniform angular deflection of the beam may not correspond to a linear trace of the luminescent spot. If the angular deflection of the beam is uniform, the luminescent spot will move at a greater velocity near the extremities and at a lesser velocity near the center of its trace across a relatively flat fluorescent screen.

To accomplish a linear trace of the luminescent spot, a compensating distortion may be introduced into the deflection waves to be applied to the yoke windings. As disclosed in the United States Patent No. 2,510,027 issued May 30, 1950, to Charles E. Torsch, it has been found desirable to introduce a type of S-shaped distortion into the deflection wave causing a slight non-uniformity of angular deflection of the electron beam, and hence, producing a linear trace of the luminescent spot on the fluorescent screen.

It is an object of this invention to provide an improved means for linearizing the trace of the luminescent spot upon the fluorescent screen of a cathode ray tube.

A further object is to provide a circuit for generating deflection wave having an S type component compensating for the non-linearity of the trace of the luminescent spot across a relatively flat screen.

Another object of this invention is to provide a sawtooth wave amplifier having a non-linear output circuit capable of imparting S type component into the sawtooth waves.

A further object is to provide in a deflection circuit a feedback path for introducing S type component into sawtooth deflection waves.

According to this invention, the deflection circuit is provided with an amplifying stage that employs a non-linear resistance element such as thyrite to shape the sawtooth deflection wave. Because of the voltage-current characteristics of this resistance element, the extreme voltages of the deflection waves are somewhat diminished and the resultant wave contains S-shaped components rather than being a strictly linear sawtooth. The non-linear resistance element may be coupled to the load impedance of the amplifying stage. According to another form of the invention the non-linear resistance element may serve as a feedback path to modify the output wave.

Figure 2:
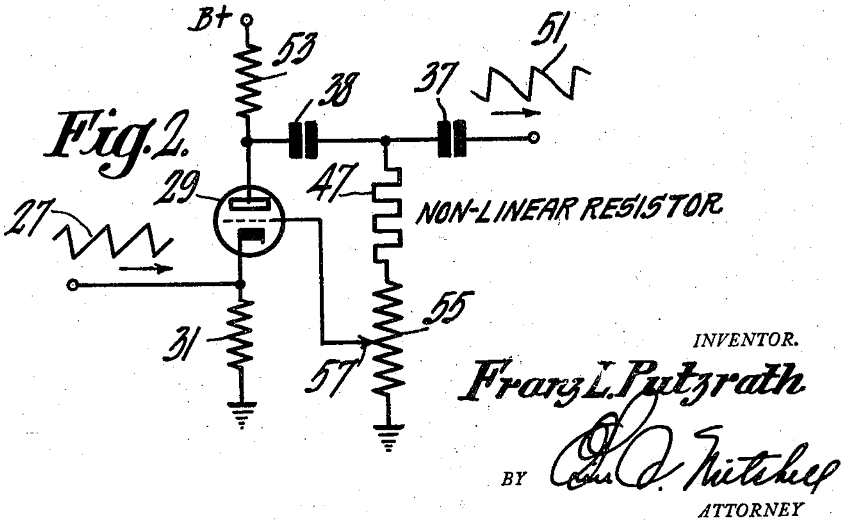

Other objects of this invention will become apparent upon a reading of the following specification and inspection of the accompanying drawing in which:

Figure 1 is a circuit diagram, partially in blocks, of a television receiving system having a deflection circuit employing the present invention; and Figure 2 is a schematic diagram of a portion of a deflection circuit showing another form of this invention.

In both figures of the drawing, similar elements are designated by the same numeral.

Referring again but in more detail to Figure 1, there is also shown a circuit arrangement of a television receiver including an antenna 11 coupled to a television signal receiving circuit 13 including a radio frequency section, a converter section, an intermediate frequency section and a detector. A sound channel is indicated by a speaker symbol 15. A video amplifier 17 supplies a video signal to the control grid of the kinescope 19 and supplies synchronizing pulses to the synchronizing signal separator 21. A horizontal deflection circuit 23 receives horizontal synchronizing pulses and provides the deflection yoke 24 with horizontal deflection waves. Vertical synchronizing pulses are supplied to the vertical deflection wave generator 25 which generates sawtooth voltage waves 27 to be impressed upon the grid of a deflection wave amplifying tube 29. Resistor 31 provides a bias voltage due to the flow of current between the anode and the cathode of the amplifying tube 29, grid leak resistor 32 applies this bias to the grid, and resistor 33 is the road resistor for this amplifying stage. A second electron tube 35 provides power amplification for the deflection waves which are supplied to its grid by a capacitive coupling 37. A grid leak resistor 39 provides the grid of this tube with the proper bias as developed in the cathode circuit by resistor 41 and capacitor 43. The output of the power amplifying tube 35 is coupled to the vertical windings of the deflection yoke 24 by a transformer 45.

The load resistor 33 of the first amplifying stage 29 is modified somewhat by a non-linear resistor 47 that is coupled to a variable contact of resistor 33 by a capacitor 49. This non-linear resistor 47 may consist of thyrite, the conductance of which increases as the function of the voltage applied across it. The current flow through this resistor increases more than a proportional amount as the applied voltage increases, and this increased current flow tends to decrease the voltage output of the amplifying tube 29. Since the non-linear resistor 47 is coupled to the load resistor 33 by a capacitor 49, direct current flow is blocked, and the sawtooth wave as it is applied to the non-linear resistor 47 contains symmetrical positive and negative lobes. The non-linear resistor 47 will effect its greatest degree of loading on amplifier tube 29 during maximum and minimum peaks of the sawtooth wave, and because of the capacitive coupling 49 the sawtooth output wave will be symmetrical about its A.C. axis. The resulting output wave 51 from this stage of amplification will therefore contain a symmetrical S type component in which the positive and negative voltage peaks are somewhat diminished, or rounded off. In other words, the rate of change of potential, or slope, of the sawtooth waveform is caused to decrease in the region of the peak values of the wave. The amount of S type component to be introduced into the sawtooth is controllable by adjustment of the variable tap of resistor 33. The S type component is somewhat exaggerated in the illustrated waveform 51 of the deflection wave output as shown in the drawing.

Another form of this invention is shown in Figure 2 which is a circuit diagram of a single stage of amplification in a deflection circuit. Sawtooth deflection waves 27 from a deflection wave generator (not shown) are applied to the cathode of an amplifying tube 29 which is biased above ground potential by a resistor 31. Resistor 53 is the load impedance element, and succeeding stages of amplification (not shown) are coupled to the anode of tube 29 by capacitors 37 and 38. In this form of the invention, the S type component is introduced into the sawtooth wave by a non-linear resistor 47 which forms a feedback path from the anode of tube 29 to the grid of the tube 29.

Capacitors 37 and 38 prevent the flow of direct current in the feedback circuit and therefore a deflection wave with symmetrical positive and negative peaks is bypassed to ground via the non-linear resistor 47 and the potential dividing resistor 55. When the voltage impressed across these serially connected resistors 47 and 55 is at a low value, a proportion of the voltage appears as a drop across resistor 47 and a remaining proportion appears as a drop across resistor 55. As the impressed voltage increases the corresponding proportional voltages likewise increase, but the proportion does not remain fixed. At relatively high values of impressed voltage the proportional drop across the non-linear resistor 47 is somewhat less than its corresponding proportional drop at low impressed voltage. It follows that the voltage drop across resistor 55 and consequently the potential at the tap 57 is at a correspondingly greater proportional value during the regions of peak value of the sawtooth wave output. Thus the deflection wave appearing at the tap 57 of the resistor 55 is modified in that the peak values are exaggerated. When this signal is fed back to the grid of the amplifying tube 29, a flattened wave appears at the anode and the S type component is thereby introduced into the amplified sawtooth wave. The amount of S type component to be introduced into the sawtooth wave is controllable by adjustment of the variable tap 57 of the potential dividing resistor 55.

Although the foregoing description and accompanying drawing show the use of this invention in correcting the linearity of vertical deflection in a television receiver it will be appreciated that the linearity of horizontal deflection may likewise be accomplished through the practice of this invention.

The term "non-linear resistance element" may be interpreted to include resistors of materials and devices that display voltage-current characteristics other than the straight-line function. While thyrite is one well known example of such a resistance element, it is not intended to limit the scope of this invention solely to the use of thyrite. Another example of a non-linear resistance device is a pair of diodes coupled together to permit current flow in either direction and which will display non-linearity because of their inherent non-linear forward resistance characteristics.

The foregoing specification and accompanying drawing disclose a circuit for adding a symmetrical S component to a sawtooth deflection wave for linearizing the trace of an electron beam which scans across a fluorescent screen symmetrically from side to side or from top to bottom. In certain applications an electron beam is emitted from an electron gun which is mounted to an off-axis position with respect to the cathode ray tube. In such cases, it may be desirable to add asymmetric correction components to the deflection waves. This may be accomplished by permitting direct current flow through the non-linear resistor, thereby causing the impressed wave to have unequal positive and negative lobes.

Although the non-linear resistor 47 has been described in the foregoing specification and illustrated in the drawing as a single thyrite resistor, it will be appreciated that in particular instances such a resistor may have characteristics of conduction which are too extreme for convenient use in an amplifying circuit. In such instances these characteristics may be altered by including other ohmic resistance elements which may be connected either in series or in shunt with the thyrite resistor.

The invention in some of its forms will be useful in television monitoring equipment and theatre projection systems as well as the more conventional home type of television receiving system. The invention in other of its forms will be useful in television camera pickup tube deflection circuits.

What is claimed is:

1. In a television receiver, a deflection system including a sawtooth wave amplifying device having three terminals, means to apply a substantially linear sawtooth wave between one of said terminals and a point of fixed reference potential, a load element coupled between another of said terminals and said point of fixed reference potential, a resistance element connecting the remaining terminal to said point of fixed reference potential, and a resistance element having a resistance characteristic varying in proportion to the potential thereacross connected to a point of fixed potential and capacitively coupled to said load element to impart an S-shaped component to said sawtooth wave.

2. In a television deflection system, a circuit for amplifying deflection waves, said circuit comprising in combination an electron tube having a control electrode, an output circuit connected to said electron tube, a feedback path coupling said output circuit to said control electrode, said feedback path including a non-linear resistor for introducing an S type component into said deflection waves.

3. A system for deflecting an electron beam in a cathode ray tube, said system comprising a circuit for generating deflection waves, a deflection yoke winding, an amplifying circuit coupled between said deflection wave generating circuit and said deflection yoke winding, said amplifying circuit including a unidirectional conduction device having at least an emitting electrode, a control electrode, and a collecting electrode, said emitting electrode being coupled to said deflection wave generating circuit, a load impedance element connected to said collecting electrode, a non-linear resistance element capacitively coupled to said load impedance element, said non-linear resistance element being coupled to the control electrode of said unidirectional conduction device, said non-linear resistance element being operative to introduce an S type component into said amplifying circuit by feeding back a portion of the deflection wave from the collecting electrode to the control electrode of said unidirectional conduction device.

4. A system for deflecting an electron beam in a cathode ray tube, said system comprising a circuit for generating deflection waves, a deflection yoke winding, an amplifying circuit coupled between said deflection wave generating circuit and said deflection yoke winding, said amplifying circuit including a unidirectional conduction device having at least a control electrode and a collecting electrode, the control electrode of said unidirectional conduction device being coupled to said deflection wave generating circuit, said collecting electrode being connected to a load resistance element having a variable contact, and a non-linear resistance element capacitively coupled to the variable contact of said load resistance element, said non-linear resistance element being operative to introduce an S type component into the deflection waves appearing at said collecting electrode.

5. A system for deflecting an electron beam in a cathode ray tube, said system comprising a circuit for generating deflection waves, a deflection yoke winding, an amplifying circuit coupled between said deflection wave generating wave circuit and said deflection wave yoke winding, said amplifying circuit including an electron tube having at least a control electrode and an anode, said control electrode being coupled to said deflection wave generating circuit, said anode being connected to a load impedance element, and a non-linear resistance element coupled to said load impedance element for the flow of alternating current, said non-linear resistance element being coupled to a source of direct current, said non-linear resistance element being operative to introduce an asymmetric S type component into deflection waves appearing at said anode.

6. A system for deflecting an electron beam in a cathode ray tube, said system comprising a circuit for generating deflection waves, a deflection yoke winding, an amplifying circuit coupled between said deflection wave generating circuit and said deflection yoke winding, said amplifying circuit including an electron tube having at least a cathode, a control electrode and an anode, said cathode being coupled to said deflection wave generating circuit, a load impedance element connected to said anode, and a non-linear resistance element coupled for passing alternating current between said anode and said control electrode, said non-linear resistance element being coupled to said load impedance element, said non-linear resistance element being operative to introduce an asymmetric S type component into the deflection wave appearing at the anode of said electron tube.

7. In a television receiver, a deflection system including an electron discharge device having cathode, control and anode electrodes, means to apply a substantially sawtooth wave between one of said electrodes and a point of fixed reference potential, a load impedance element connected between said anode electrode and a point of fixed positive energizing potential, a resistance device connected between the remaining electrode and said point of fixed reference potential to determine the degree of current flow in said electron discharge device, and an impedance element having a resistance proportional to the potential thereacross capacitively coupled to said load impedance element.

8. In a television receiver, a deflection system including an electron discharge device having cathode, control and anode electrodes, means to apply a substantially sawtooth wave between said control electrode and a point of fixed reference potential, a load resistor connected between said anode electrode and a point of fixed positive energizing potential, a resistance device connected between the cathode electrode and said point of fixed reference potential to determine the degree of current flow in said electron discharge device, and a resistor having a resistance proportional to the potential thereacross capacitively coupled to a point on said load impedance element and said point of fixed positive energizing potential.

9. In a television receiver, a deflection system including an electron discharge device having cathode, control and anode electrodes, means to apply a substantially sawtooth wave between said cathode electrode and a point of fixed reference potential, a load resistor connected between said anode electrode and a point of fixed positive energizing potential, a resistance device connected between the control electrode and said point of fixed reference potential to determine the degree of current flow in said electron discharge device, and a resistor having a resistance proportional to the potential thereacross capacitively coupled to said load impedance element and connected to said resistance device.

10. In a television deflection system, apparatus for producing a modified sawtooth wave, comprising in combination: wave amplifying apparatus having an input circuit and an output circuit; means operatively connected to said input circuit for applying a wave of substantially sawtooth form to said wave amplifying apparatus; said output circuit having load means for developing said modified sawtooth wave thereacross, said load means including an impedance element having an impedance characteristic varying inversely with the potential thereacross, said impedance element being coupled in shunt relation across said load means thereby to cause a dynamic change in the net impedance of said load means with changes in said potential developed thereacross, whereby the sawtooth wave developed across said load means is modified by said dynamic change in load impedance.

11. In a television system, apparatus for producing a wave having a sawtooth component and an S-shaped component, comprising in combination: wave amplifying apparatus having an input circuit and an output circuit; means operatively connected to said input circuit for applying a wave of substantially sawtooth form to said wave amplifying apparatus, thereby developing in said output circuit an amplified sawtooth wave; said output circuit having load means for developing said wave having a sawtooth component and an S-shaped component, said load means including an impedance element having an impedance characteristic varying inversely with the potential thereacross, said impedance element being coupled in shunt relation across said load means thereby to cause a dynamic change in the net impedance of said load means with changes in said potential developed thereacross, whereby said amplified sawtooth wave is modified by said dynamic change in load impedance thus imparting said S-shaped component onto said sawtooth wave producing a wave having a sawtooth component and an S-shaped component.

12. In a television deflection system, apparatus for deriving from a sawtooth wave a modified sawtooth wave having a slope which varies inversely as a function of the amplitude of said sawtooth wave and which is symmetrical about its A.C. axis, said apparatus comprising in combination: wave amplifying apparatus having an input circuit and an output circuit; means operatively coupled to said input circuit for applying a wave of substantially sawtooth form to said wave amplifying apparatus; said output circuit having load means for developing said modified symmetrical sawtooth wave thereacross, said modified sawtooth wave having a D.C. component and an A.C. component; a conductance device having a conductance characteristic which varies as a function of the potential applied thereacross, load coupling means operatively coupling said conductance device to said load means in effective shunt relation therewith, thereby to cause a dynamic change in the net conductance of said load means with changes in said potential thereacross, thus varying said slope inversely as a function of the amplitude of said sawtooth wave; said load coupling means including a capacitor connected in series with said conductance device for permitting only the A.C. component of said sawtooth wave to be applied across said conductance device thereby causing the instantaneous values of said conductance to be equal during corresponding positive and negative excursions of said sawtooth wave thus achieving slope modification of said sawtooth wave symmetrically about the A.C. axis of said sawtooth wave.

References Cited in the file of this patent

UNITED STATES PATENTS

| | | |
|---|---|---|
| 2,294,908 | Hussey | Sept. 8, 1942 |
| 2,589,299 | Setchell | Mar. 18, 1952 |
| 2,596,590 | Overton | May 13, 1952 |
| 2,606,306 | Bridges | Aug. 5, 1952 |
| 2,760,159 | Brown | Aug. 21, 1956 |
| 2,761,090 | Thalner | Aug. 28, 1956 |